United States Patent [19]

Leendersen

[11] Patent Number: 5,783,308
[45] Date of Patent: Jul. 21, 1998

[54] CERAMIC REINFORCED FLUOROPOLYMER

[75] Inventor: Howard V. Leendersen, Bellevue, Wash.

[73] Assignee: Quaker State Corporation, Irving, Tex.

[21] Appl. No.: 738,015

[22] Filed: Oct. 25, 1996

[51] Int. Cl.[6] ............................................. B32B 27/00
[52] U.S. Cl. ........................ 428/422; 428/497; 524/546; 524/787
[58] Field of Search ............................ 427/190, 195, 427/385.5; 428/421, 422, 497, 498, 499; 524/544, 545, 546, 787, 904, 275, 487, 520

[56] References Cited

U.S. PATENT DOCUMENTS

| | | |
|---|---|---|
| 4,419,406 | 12/1983 | Isobe et al. ........................ 428/422 |
| 4,850,302 | 7/1989 | Hoffman ........................ 118/629 |
| 5,061,548 | 10/1991 | Arthur et al. ........................ 524/544 X |
| 5,356,971 | 10/1994 | Sagawa et al. ........................ 524/544 X |
| 5,358,775 | 10/1994 | Horn ........................ 428/421 X |
| 5,374,453 | 12/1994 | Swei et al. . |

*Primary Examiner*—Michael Lusignan
*Attorney, Agent, or Firm*—McDonnell Boehnen Hulbert & Berghoff

[57] ABSTRACT

A dispersion including at least one carrier, from about 0.1 to about 20.0 weight percent of at least one particulate fluoropolymer, and from about 0.1 to about 20.0 weight percent of at least one particulate boron nitride, the dispersion being useful as a coating to give a ceramic reinforced fluoropolymer substrate.

15 Claims, No Drawings

CERAMIC REINFORCED FLUOROPOLYMER

BACKGROUND OF THE INVENTION

(1) Field of the Invention

This invention is a ceramic reinforced fluoropolymer composition and method for plating a substrate with a dispersion to give a ceramic reinforced polymer coated substrate. The dispersion comprises an admixture of PTFE particles and boron nitride particles. This invention is also a method of coating a substrate with an admixture of a dispersion of particulate fluoropolymer and particulate boron nitride.

(2) Description of the Art

The plating of articles by composite coating using finely dispersed divided particulate matter is well known. Plating technology has been widely practiced in the field of electroplating as well as electrolyses plating, chemical plating, and chemical/mechanical plating. The acceptance of such composite coating stems from the recognition that the inclusion of finely divided particulate matter in a substrate coating can significantly alter the properties of the coated substrate with respect to properties such as wear resistance, corrosion resistance, appearance, lubricity, and so forth.

Substrate electrolyses plating is described in Oderkerken U.S. Pat. No. 3,614,183 in which finely divided aluminum oxide was interposed between electrodeposited layers on a substrate to provide corrosion resistance. Christini et al., U.S. Pat. No. Re 33,767 describes the codeposition of diamond particles in an electrolyses plating process. Another reference, Yano et al in U.S. Pat. No. 4,666,786, describes plating a substrate with silicon carbide and boron nitride to achieve improved wear and sliding properties. Feldstein in U.S. Pat. Nos. 4,358,922 and 4,358,923 describe the advantages of using a metallic layer above the particulate coated layer. Spencer in U.S. Pat. No. 4,547,407 describes using a mixture of dual sized particles in achieving improved smoothness of a coating. Feldstein et al in U.S. Pat. Nos. 4,997,686 and 5,145,517 describe using stabilizers in coating composition to stabilize the composition particulate matter.

Helle et al in U.S. Pat. Nos. 4,098,654 and 4,302,374 describe compositions useful for preparing stabilized PTFE dispersions and then using the dispersions in electrolytic plating. The examples of Helle et al describe the advantage of securing highly stabilized dispersions for the PTFE and their incorporation thereafter in the presence in strong electrolytes normally present in the electroplating baths.

Despite advances in substrate coating technology, and in particular, substrate fluoropolymer coating technology, there remains a need for compositions and methods that produce a coated substrate with improved lubricity, durability, hardness, and corrosion resistance.

SUMMARY OF THE INVENTION

An object of this invention is to provide a composition that, when applied to a substrate provides a ceramic reinforced fluoropolymer coated substrate.

Another object of this invention is to provide a dispersion that is easy to apply to a substrate to give a ceramic reinforced fluoropolymer coated substrate.

Still another object of this invention is a ceramic reinforced fluoropolymer coating.

In one embodiment, this invention is a dispersion comprising an admixture of at least one carrier, at least one fluoropolymer and at least one boron nitride.

In another embodiment, this invention is a dispersion including an admixture of at least one carrier, from about 0.1 to about 10.0 weight percent particulate PTFE having a particle size ranging from about 0.1 microns to about 25 microns, and from about 0.1 to about 10.0 weight percent particulate boron nitride having a particle size ranging from about 0.1 microns to about 25 microns.

In another embodiment, this invention is a method for preparing a dispersion useful for applying a ceramic reinforced polymer coating to a substrate. The method includes admixing at least one powdered fluoropolymer, at least one powdered boron nitride, and a carrier to give a dispersion including from about 0.1 to about 25.0 weight percent particulate fluoropolymer, from about 0.1 to about 25.0 weight percent particulate boron nitride, and from about 50.0 to about 99.8 weight percent of the carrier.

In another embodiment, this invention is a method for applying a fluoropolymer dispersion to a substrate to give a ceramic reinforced fluoropolymer coated substrate.

DESCRIPTION OF THE CURRENT EMBODIMENT

The present invention relates to a ceramic reinforced fluoropolymer composition that is produced from a liquid dispersion of fluoropolymer particles and boron nitride particles. This invention also includes methods for applying the liquid dispersion to substrates as well as the resulting ceramic reinforced fluoropolymer coated substrates.

Particulate fluoropolymers and particulate boron nitride are both well known lubricants. This invention is based on the discovery that the combination of at least one particulate fluoropolymer and particulate boron nitride in a liquid dispersion, when applied to a substrate, gives a ceramic reinforced fluoropolymer coated substrate, the ceramic reinforced fluoropolymer coating that is more durable than a substrate coated with either a particulate fluoropolymer dispersion or with a particulate boron nitride dispersion alone.

A fluoropolymer is the first ingredient of the dispersion. The fluoropolymer is added to the composition because of its properties as a lubricant friction modifier, an anti-stick agent, a corrosion inhibitor coating, and for all other reasons known to those of skill in the art for applying a particulate fluoropolymer dispersion to a substrate. One or more fluoropolymers may be added to the dispersion. Each fluoropolymer should have a particle size ranging from about 0.1 micron to about 250 microns, preferably from about 0.1 microns to about 25 microns, and most preferably from about 0.1 microns to about 5.0 microns. The size of the fluoropolymer particles in a large measure controls the ability of the fluoropolymer to remain dispersed in a ceramic reinforced fluoropolymer coating composition with the smaller particles being easier to keep dispersed in the composition.

The amount of particulate fluoropolymer in the ceramic reinforced fluoropolymer coating composition will depend, in large part, upon the end use for the composition. For example, a composition that is intended to be added to the crankcase of an automobile will require a smaller amount of particulate fluoropolymer in order to be effective than a composition that is intended to be used, for example, to coat cooking surfaces. Thus, the dispersion of this invention will include from about 0.1 to about 25.0 weight percent of at least one particulate fluoropolymer, preferably from about 0.1 to about 10.0 weight percent of at least one particulate fluoropolymer, and most preferably from about 0.5 to 5.0 weight percent of at least one particulate fluoropolymer.

Any known fluoropolymer that is manufactured in small particles may be used in the dispersion of this invention either singly or as a combination of two or more particulate fluoropolymers. A preferred particulate fluoropolymer is PTFE, and in particular, TEFLON®, manufactured by E.I. DuPont De Nemours, Wilmington, Del.

The second component of the dispersion of this invention is particulate boron nitride. Particulate boron nitride is used in the coating composition of this invention, in part, because of its ceramic and lubricating properties. The particulate boron nitride that is used in the composition of this invention should be made of up discrete particles that are small enough in size to facilitate their dispersion in the ceramic reinforced fluoropolymer coating composition. It is, therefore, preferred that the particulate boron nitride have particle sizes ranging from about 0.1 microns to about 250 microns, and more preferably from about 0.01 microns to about 25 microns. It is most preferred that the boron nitride particles have sizes ranging from about 0.1 microns to about 5 microns.

As with the fluoropolymer, the amount of boron nitride in the dispersion of this invention will depend, in part, upon the end use for the coating composition. The ceramic reinforced fluoropolymer coating composition of this invention will preferably include from about 0.1 to about 20.0 weight percent boron nitride, preferably from about 0.1 to about 10.0 weight percent boron nitride, and most preferably from about 0.5 to about 5.0 weight percent boron nitride.

The term particle size as it is used herein to describe particulate fluorocarbons and particulate boron nitride refers to an average particle diameter. Additionally, particulate fluoropolymer and particulate boron nitride will still fall within the scope of the preferred particle size ranges above even if they have up to about 20 weight percent of the particles with sizes that fall below and above the stated ranges. Furthermore, the particulate fluoropolymer and particulate boron nitride can be present as discrete particles or as colloidal particles.

The ceramic reinforced fluoropolymer coating composition of this invention includes at least one liquid carrier. The liquid carrier facilitates the uniform dispersion of the particulate fluoropolymer and the particulate boron nitride so that the resulting dispersion can be uniformly applied to a substrate. The carrier also imparts thermal stability and suspension stability to the coating composition.

The liquid carrier chosen will depend on the end use of the coating composition of this invention. For example, if the coating composition is intended to be used to coat the internal surfaces of an internal combustion engine, then a carrier that is compatible with an engine lubricant will be chosen. Alternately, if the composition is intended to be applied to a substrate as a corrosion inhibitor, the carrier may be water or any one of a number of carriers used in the paint composition art.

Non-limiting examples of useful carriers include water, mineral oils, petroleum based oils and solvents, synthetic oils such as diesters and polyalphaolephines, silicone oils, polyoxyalkylene glycol, polyphenyl ether, polymerizable liquids, liquid polymers, liquids containing polymers, compatible mixtures thereof, and any other carrier know to those of skill in the art to be useful in conjunction with either particulate boron nitride dispersions or in conjunction with particulate fluoropolymer dispersions. The carrier will be present in the composition in an amount ranging from about 50.0 weight percent to about 99.8 weight percent.

A preferred carrier is a petroleum oil and specifically a solvent refined paraffinic petroleum base oil.

The composition of this invention may optionally include additives such as surfactants, dispersion agents, thermal stabilizers, viscosity modifiers, and any other components that are known to those of skill in the art to be useful in imparting desirable properties to solid/liquid dispersions.

The dispersion of this invention may be prepared by a number of methods. In one method, a liquid dispersion of a fluoropolymer may be admixed with a liquid dispersion of boron nitride to give the ceramic reinforced fluoropolymer coating composition of this invention. In another method, the particulate fluoropolymer and the particulate boron nitride can each be supplied as powders that can be incorporated into a liquid carrier by mixing to give a fluoropolymer/boron nitride dispersion of this invention. In yet another method, the particulate fluoropolymer may be supplied as a liquid dispersion and the particulate boron nitride as a powder that is incorporated into the particulate fluoropolymer dispersion by mixing, or the particulate fluoropolymer can be supplied as a solid and the particulate boron nitride as a liquid dispersion.

It is preferred that the composition of this invention is manufactured from an admixture of a liquid dispersion of PTFE and a liquid dispersion of boron nitride. Any known commercially available dispersions of PTFE and boron nitride may be used to manufacture the composition of this invention. A preferred dispersion of PTFE is a dispersion of particulate PTFE in a 150 solvent refined paraffinic base oil carrier. The preferred PTFE dispersion is manufactured by Acheson Colloid, Co., Port Huron, Mich. and sold as part number SLA 1612. A preferred dispersion of boron nitride is a particulate dispersion of boron nitride in a 150 solvent refined paraffinic petroleum base oil. The preferred boron nitride dispersion is manufactured by Acheson Colloid, Co., Port Huron, Mich. and is sold as part number JB 33018.

The fluoropolymer/boron nitride dispersion may be applied in any manner known in the art for coating a substrate with either a particulate fluoropolymer dispersion or with a particulate boron nitride dispersion to give a ceramic reinforced fluoropolymer coated substrate of this invention. Non-limiting examples of methods useful for applying the composition of this invention to a substrate include: dipping the substrate into the coating composition; spraying the coating composition on a substrate; painting; vapor deposition; plating, liquid deposition and mechanical deposition. In a preferred embodiment, mechanical deposition is used to apply the dispersion of this invention to the internal surfaces of an internal combustion engine to give a ceramic reinforced fluoropolymer coated engine. The composition, including a carrier compatible with the engine motor oil will be poured into the engine crank case where it combines with the crank case oil from which it is distributed throughout the internal surfaces of an internal combustion engine. Thereafter, it is believed that the mechanical movement and rubbing of the cylinders against the non-moving metal surfaces causes the dispersion to mechanically be coated onto the engine internal surfaces.

The composition of this invention may be applied to any substrate that is known in the art to be capable of being coated with either a fluoropolymer dispersion or with a boron nitride dispersion. Substrates that can be coated or treated with the dispersion of this invention to give a ceramic reinforced fluoropolymer coated substrate may be manufactured, for example, of metal or plastic. The composition may be applied to the internal surface of a substrate, the external surface of a substrate, or both. In addition, the composition of this invention my be used as a corrosion encapsulating agent, or as a corrosion barrier in which case the composition may be applied to corroded metals, to bare metals, or to an already painted or coated substrate.

The composition of this invention is an excellent encapsulating composition. As such, the composition may be applied to encapsulate lead paint, asbestos, and other potentially toxic substrate coatings. Furthermore, the coating composition of this invention may be used in association with other coatings to give a substrate including a plurality of coated layers at least one of which is a layer of ceramic reinforced fluoropolymer. For example, a substrate can be coated with a metal layer in an electrolyses plating bath after which the composition of this invention can be applied to the metal coated substrate to give a ceramic reinforced fluoropolymer/metal bi-coated substrate.

Once the dispersion of this invention has been applied to a substrate, the coated substrate may be further treated to cause the dispersion to form a ceramic reinforced fluoropolymer coating on the substrate. Possible post-coating treatment steps include drying, vacuum drying, curing, and any other treatment known in the art for producing a coating from a liquid particulate dispersion. In one method, a carrier that is comprised of a polymerizable compound may be cured to polymerize the polymerizable compound to give a hard, durable, ceramic reinforced fluoropolymer coated substrate.

Another preferred method for producing ceramic reinforced fluoropolymer coated substrate is by drying the dispersion coated substrate in an oven at a temperature ranging from about 50° C. to about 300° C. More preferably, the curing step occurs in a vacuum oven. A vacuum oven facilitates the volatilization of a volatile carrier from the ceramic reinforced fluoropolymer coating composition at low temperatures. Of course, the dispersion coated substrate may be air dried to give a ceramic reinforced fluoropolymer coated substrate.

Under certain circumstances, it may be desirable to expose the composition of this invention to temperatures above about 300° C. to give a ceramic reinforced fluoropolymer substrate. This is especially true where the substrate is metal because at high temperatures, the fluoride in the fluoropolymer can react with boron and/or the metal substrate to give boron and metal fluorides. Both of these reactions result in a coating that is, in effect, chemically bound to the metal substrate surfaces. Finally, the composition of this invention can be applied hot or cold to a hot or cold substrate.

The ceramic reinforced fluoropolymer coating composition of this invention may be applied to a substrate to any desired coating thickness. The thickness of the coating will depend largely upon the loading of particulate fluoropolymer and particulate boron nitride in the ceramic reinforced fluoropolymer coating composition as well as on the viscosity of the composition. A ceramic reinforced fluoropolymer coating composition with a high viscosity and up to 20.0 weight percent fluoropolymer and 20.0 weight percent boron nitride will, when cured, give a substrate with a thick coating. Conversely, a ceramic reinforced fluoropolymer coating composition having a low viscosity and including small amounts of particulate fluoropolymer and particulate boron nitride will, when cured, give a substrate with a thin coating.

EXAMPLE 1

The resistance to abrasion of four fluids were investigated in this Example using the Ball on Cylinder Lubricity Evaluator (BOCLE) (ASTM D 5001). The ball on cylinder lubricity evaluator assesses the wear aspects of the boundary lubrication properties of a fluid. The fluid under test is placed in a test reservoir in which atmospheric air is maintained at 10% relative humidity. A non-rotating steel ball is held in a vertically mounted chuck and forced against an axially mounted steel ring with an applied load. The test cylinder is rotated at a fixed speed while being partially immersed in the fluid reservoir. This maintains the cylinder in a wet condition and continuously transports the test fluid to the ball/cylinder interface. The wear scar generated on the test ball is a measure of the fluid lubricating properties.

The first fluid tested was 100 weight percent of a 150 solvent refined paraffinic petroleum base oil. The second fluid tested was a combination of 98.0 weight percent of a 150 solvent refined paraffinic petroleum base oil and 2.0 weight percent of 10 wt % boron nitride/150 solvent refined paraffinic base oil dispersion. The boron nitride dispersion used was JB 33018. The resulting second fluid included 0.2 wt % boron nitride and 98.8 wt % 150 solvent refined paraffinic base oil. The third fluid was a stabilized dispersion of PTFE. The stabilized PTFE dispersion included 95.0 weight percent of a 150 solvent refined paraffinic petroleum base oil and 5.0 weight percent of a 20 wt % dispersion of PTFE in 150 solvent refined paraffinic base oil. The resulting third fluid included 1.0 wt % PTFE and 99.0 wt % 150 solvent refined paraffinic base oil. The fourth fluid consisted of a mixture including 93.0 weight percent of a 150 solvent refined paraffinic petroleum base oil, 5.0 weight percent of the PTFE dispersion, and 2.0 weight percent boron nitride dispersion to give a fourth fluid including 1.0 wt % of PTFE, 0.2 wt % boron nitride, and 98.8 wt % 150 solvent refined paraffinic base oil carrier.

The results of the BOCLE tests are set forth in Table I below.

TABLE I

| Composition No. | Scuff Depth (mm) |
| --- | --- |
| 1 | 0.72 |
| 2 | 0.635 |
| 3 | 0.585 |
| 4 | 0.53 |

These results indicate that a synergism is achieved by combining a dispersion of PTFE with a dispersion of boron nitride. Such a dispersion (composition 4) exhibited a 10 percent wear/friction improvement when compared to a PTFE dispersion alone, and 20 percent wear/friction improvement over a boron nitride dispersion alone.

EXAMPLE 2

The Example demonstrates that boron nitride acts as a reinforcing agent in thin TEFLON® coatings to improve the ability of the TEFLON® to resist being worn away by abrasion.

A. Control Test

A clean stainless steel capillary die with internal capillary dimensions of 0.05 cm diameter×2.54 cm length×180° entrance angle was placed in an Instron capillary rheometer. A polyethylene with a melt index of one, commercially available as D7047 from Union Carbide, and containing 2.5% colloidal silica abrasive was extruded through the capillary at a temperature of 220° C. and at a shear rate of 700 s$^{-1}$.

The pressure required to extrude the abrasive polyethylene through the capillary die remained constant at 0.5 MPa throughout the one hour duration of the test.

B. Capillary coated with Teflon, no Boron Nitride

The capillary die used in the previous example was thoroughly cleaned by burning out any residue at 800° C. The capillary was coated with TE 5121A fluoropolymer manufactured by DuPont De Nemours, Wilmington, Del. which is a 3% by wt. solution of a TEFLON® fluoropolymer dissolved in a perfluorinated solvent. The coated capillary was dried for 4 hours at 200° C. and was placed in the Instron rheometer and the same polyethylene containing the abrasive was extruded through the capillary at a temperature of 220° C. and a shear rate of 700 $s^{-1}$.

Result of Test B

The pressure required to extrude the abrasive polyethylene through the capillary die was initially 0.2 Mpa, which is less than half the pressure required to extrude the polyethylene through the capillary die in the previous example. This reduction in pressure is the result of the presence of the coating that allows the polyethylene to slip at the wall of the capillary and thus flow through the die more easily. The pressure remained constant at 0.2 MPa for about 6 minutes and then increased slowly to 0.5 MPa and then remained constant at this value, which is the same pressure as observed in the uncoated capillary. The slow increase in pressure up to the value observed for the capillary that was not coated with TEFLON® is due to the slow wearing away of the TEFLON® coating by the abrasive colloidal silica in the polyethylene.

C. Capillary coated with Teflon and Boron Nitride

The capillary die used in the previous examples was thoroughly cleaned by burning out any residue at 800° C. The capillary was coated with an admixture a 3% solution of TEFLON® TE 5121A fluoropolymer and 1% by wt boron nitride fine powder. The coated capillary was dried for 4 hours at 200° C. and was placed in the Instron rheometer and the same polyethylene containing the abrasive was extruded through the capillary at a temperature of 220° C. and a shear rate of 700 $s^{-1}$.

Result of Test C

The pressure required to extrude the abrasive polyethylene through the capillary die was initially 0.2 Mpa, which is the same as the capillary coated with only TEFLON®, but is less than half the pressure required to extrude the polyethylene through the uncoated capillary. This reduction in pressure is again the result of the presence of the Teflon coating that allows the polyethylene to slip at the wall of the capillary and thus flow through the die more easily. The pressure remained constant at 0.2 MPa for about 20 minutes and then increased slowly to 0.5 MPa after about one hour. The pressure then remained constant at 0.5 MPa, which is the same pressure as observed in the uncoated capillary. The slow increase in pressure up to the value observed for the capillary that was not coated with TEFLON® and boron nitride is again due to the slow wearing away of the TEFLON® and boron nitride coating by the abrasive colloidal silica in the polyethylene. Thus, the use of a boron nitride/TEFLON® coating dispersion significantly increased the time required for the abrasive to wear away the coating.

While the present invention has been described by means of specific embodiments, it will be understood that modifications may be made without departing from the spirit of the invention. The scope of the invention is not to be considered as limited by the description of the invention set forth in the specification and examples, but rather as defined by the following claims.

What I claim is:

1. A dispersion comprising an admixture of at least one carrier, from about 0.1 to about 25.0 wt % of particulate fluoropolymer and from about 0.1 wt % to about 25.0 wt % of particulate boron nitride.

2. The dispersion of claim 1 wherein the fluoropolymer is PTFE.

3. The dispersion of claim 1 wherein the boron nitride is present in the dispersion as a plurality of particles ranging in size of from 0.1 microns to about 250 microns.

4. The dispersion of claim 1 wherein the fluoropolymer is present in the dispersion as a plurality of particles ranging in size from about 0.1 microns to about 250 microns.

5. The dispersion of claim 1 wherein the carrier is a paraffinic base oil.

6. A dispersion comprising an admixture of at least one carrier, from about 0.1 to about 10.0 weight percent PTFE having a particle size ranging from about 0.1 microns to about 25 microns, and from about 0.1 to about 10.0 weight percent boron nitride having a particle size ranging from about 0.1 microns to about 25 microns.

7. The dispersion of claim 6 wherein the carrier is a paraffinic base oil.

8. A method for preparing a dispersion comprising admixing powdered fluoropolymer, powdered boron nitride, and a carrier to give a dispersion including from about 0.1 to about 25.0 weight percent particulate fluoropolymer, from about 0.1 to about 25.0 weight percent particulate boron nitride, and from about 50.0 to about 99.8 weight percent of the carrier.

9. The method according to claim 8 wherein the particulate fluoropolymer is a powder.

10. The method according to claim 8 wherein the particulate boron nitride is a powder.

11. The method according to claim 8 wherein the particulate boron nitride is a dispersion.

12. The method according to claim 8 wherein the particulate fluoropolymer is dispersion.

13. The method according to claim 8 wherein the ceramic reinforced fluoropolymer dispersion is applied to a substrate to give a ceramic reinforced fluoropolymer coated substrate.

14. A ceramic reinforced fluoropolymer coated substrate prepared by the method of claim 13.

15. A substrate including at least a partial coating comprising an admixture of effective film-forming amounts of at least one particulate boron nitride and at least one particulate fluoropolymer.

* * * * *